July 11, 1950   C. N. CROSSLEY ET AL   2,514,596
METHOD OF PREPARING COFFEE BEVERAGE
Filed Dec. 16, 1946   8 Sheets-Sheet 6

INVENTORS
Charles N. Crossley
Raymond J. Gagan
By: Banning & Banning
Attys.

July 11, 1950 — C. N. CROSSLEY ET AL — 2,514,596
METHOD OF PREPARING COFFEE BEVERAGE
Filed Dec. 16, 1946 — 8 Sheets-Sheet 7

INVENTORS
Charles N. Crossley
Raymond J. Gagan

Patented July 11, 1950

2,514,596

UNITED STATES PATENT OFFICE 2,514,596

METHOD OF PREPARING COFFEE BEVERAGE

Charles N. Crossley, Riverside, and Raymond J. Gagan, Oak Park, Ill., assignors to Cory Corporation, Chicago, Ill., a corporation of Delaware Application December 16, 1946, Serial No. 716,500

2 Claims. (Cl. 99—71)

This invention relates to beverage brewers used in restaurants and other commercial establishments for preparing large or repeated quantities of beverage such as coffee, and particularly to commercial brewers of the type wherein the beverage is prepared by infusion at a point remote from a heat source.

It is an object of the present invention to provide in a commercial automatic brewer an improved construction and arrangement of coffee cartridge and hot water duct whereby to facilitate the operation of preparing the beverage. Specifically, we contemplate directing the heated liquid from a tank or water source through a duct and downwardly into the cartridge, causing the liquid to penetrate the charge over a relatively small area, thence spreading out and working its way upwardly again from the lower portion of the charge to the top thereof from whence the infusion is withdrawn at the point of delivery. In this way, a very thorough impregnation of the coffee by the liquid is assured, and the cartridge need not be equipped with a check valve or like device to control the flow of liquid or to prevent dripping when the cartridge is removed for refilling.

A further object is to connect the coffee cartridge to the water duct in an improved manner which eliminates unwanted leakage and facilitates the insertion and removal of the cartridge. These features are realized by using a novel flexible connection between the duct and the portion of the removable cartridge assembly where the water first enters the charge, and also mounting the cartridge on the supporting structure for the duct by a novel clamping means.

A still further object is to automatically control the amount of water which flows through each individual charge of the beverage-producing ingredient by causing the water flow to cease when the amount of delivered infusion exceeds a predetermined weight.

These and other objects of the invention will be more fully set forth in the following specification taken in conjunction with the accompanying drawings, wherein like reference numerals refer to like parts throughout:

Fig. 12 is a wiring diagram of the beverage brewer.

Figure 1:
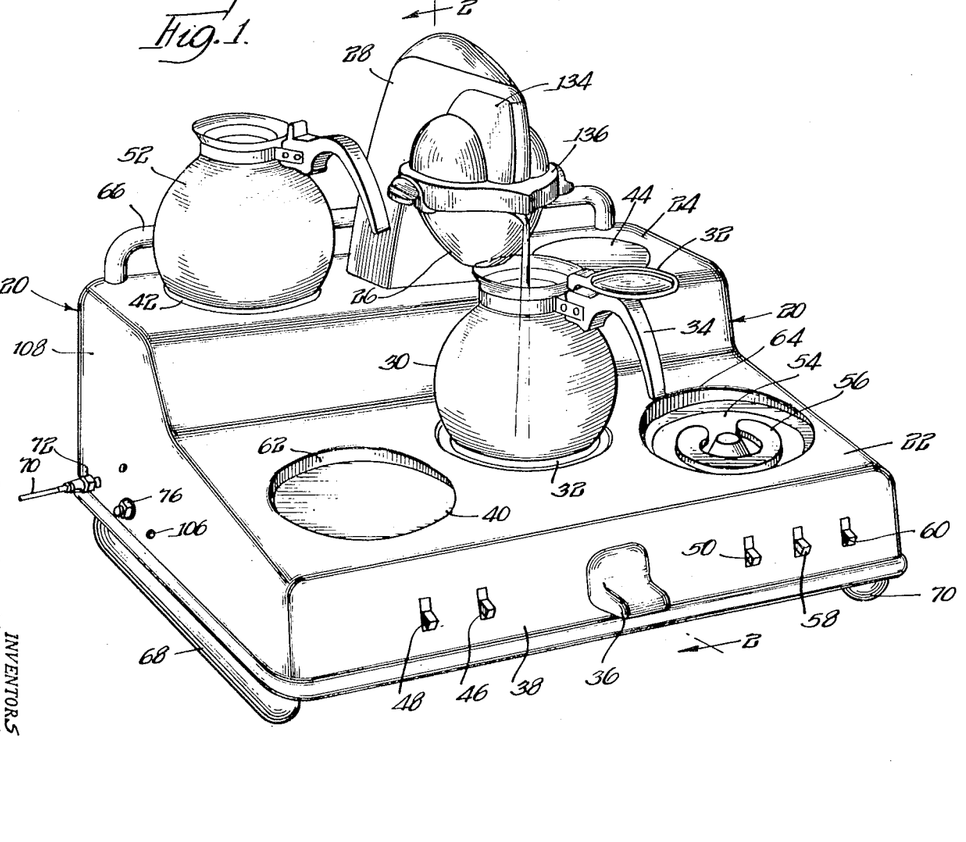
Fig. 1 is a perspective view of a beverage brewer constructed in accordance with and embodying the principles of the invention.
Figure 1E:
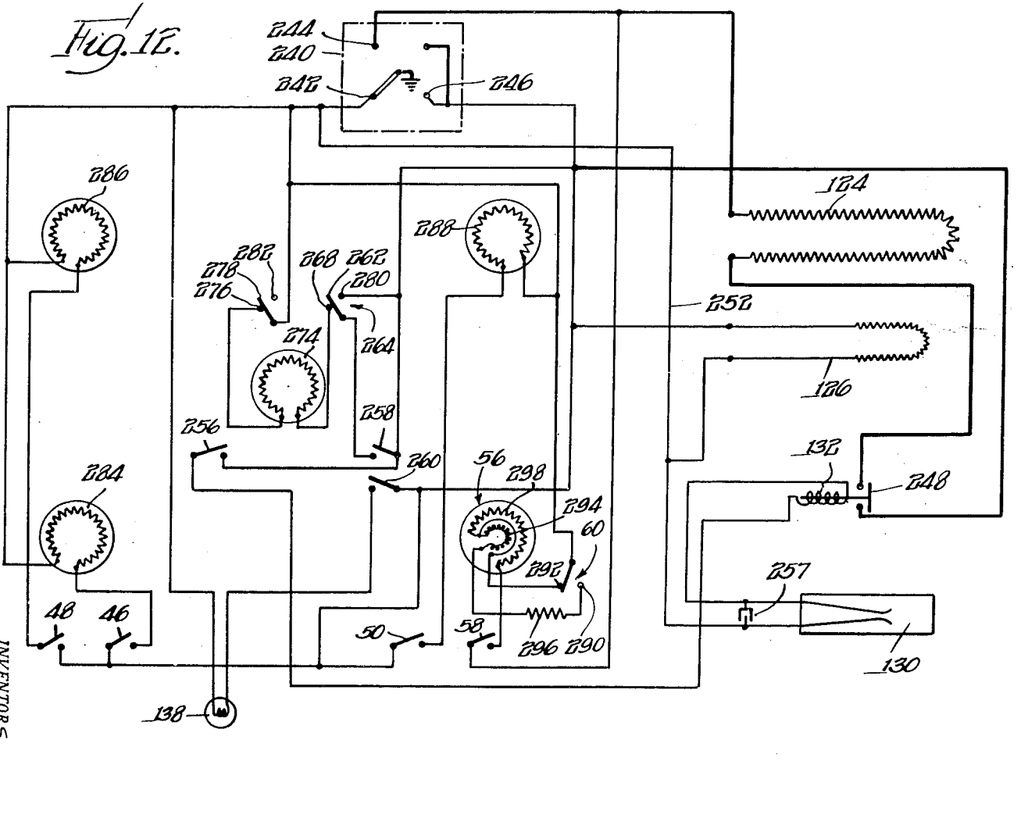

Referring to Fig. 1, the beverage brewer is provided with an attractive chassis 20 of stainless steel or other suitable metal having stepped lower and upper sections 22 and 24, respectively.

The beverage is prepared near the point of delivery thereof in a cartridge 26 attached to a housing or head 28 which projects upwardly from the upper section 24. The cartridge 26, as will be explained in greater detail hereinafter, contains a charge of beverage-producing ingredient such as ground coffee. Water under pressure from a suitable source thereof, such as the city water supply, is piped to the water tank of the brewer where it is heated to the correct temperature for brewing the beverage. The water then is directed through a duct, which extends through the housing 28, into the cartridge 26 where it slowly permeates the charge of ingredient therein. The finished brew emerges from a suitable outlet in the cartridge 26 and is delivered to a decanter 30 which is positioned on a weighing platform 32 in the lower section 22 of the brewer. The decanter 30, made of glass or other material as desired, may be provided with a hinged plastic cover 33 and a plastic handle 34, as shown in Fig. 1, or it may be of the type shown in Fig. 2 having a handle but no cover.

The brewing operation is started by depressing a control handle 36 projecting from the front panel 38 of the lower section 22. A beverage weighing mechanism, which forms a part of the brewer, automatically shuts off the supply of heated water to the cartridge 26 when a predetermined amount of beverage has been delivered to the decanter 30, at the same time automatically restoring the handle 36 to its normal up position.

To aid in maintaining a large quantity of freshly prepared beverage on hand, the brewer is provided with warming plates such as 40 in the lower section 22, and 42 and 44 in the upper section 24. On-off switches 46, 48 and 50 are provided on the front panel 38 for operating these warming plates. Thus, when the required amount of beverage has been delivered to a decanter, the decanter may be moved to a warming plate, as in the case of the decanter 52 shown on the warming plate 42 in Fig. 1, where the beverage is maintained at drinking temperature by a suitable warming element until used. An additional heating area 54 is shown in the lower section 22, and a combined high and low heat element 56 is disposed in this area. The element 56 is controlled by an on-off switch 58 and a high-low switch 60 on the front panel 38. The element 56 can be used for warming a quantity of beverage on low heat, and it can also be used on high heat to boil water for use in preparing tea, for example.

It should be noted that the lower section 22 of the chassis 20 is slanted upwardly from the front panel 38, whereas the warming areas 40 and 54 are substantially horizontal. Tapered arcuate stop walls 62 and 64 integral with the chassis 20 extend around the rearward portions of the warming areas 40 and 54, respectively, the front portions of these areas being substantially flush with the surface of the chassis. This arrangement facilitates proper registration of the decanter with the heating element while enabling the decanter to be conveniently withdrawn and replaced. In the upper section 24 the surface of the chassis is horizontal and substantially flush with the warming plates 42 and 44. A back stop, in the form of a bar or rod 66, is mounted on the chassis 20 at the rear of the upper section 24 to aid in registering decanters as 52 with the warming elements and also to prevent the decanters from being accidentally pushed off the rear edge of the chassis. The entire beverage brewer is mounted on side rails 68 and 70 which may be provided with leveling devices (not shown) for properly orienting the weighing mechanism of the brewer with respect to horizontal.

The illustrated beverage brewer is adapted to be used in conjunction with a source of water under pressure, such as the city water supply. The water is taken in through a pipe 70, Figs. 1 and 4, which is connected by a nipple 72 to a bracket or fitting 74, Fig. 4. The water is conducted by suitable tubing and coupling members past a filter 76 and needle valve 80 to a tube 82 which communicates with the inlet side of a valve 84, Figs. 5 and 7, that is controlled by the beverage weighing mechanism. Assuming this valve to be open, the flow of water continues through a tube 86, Fig. 4, to the inlet of a water heating tank 88, preferably of stainless steel, where the temperature of the water is raised to a predetermined level. From the tank 88 the heated water rises through a pipe or duct 90, Fig. 2, which extends through the housing or head 28. The pipe 90 has a downwardly extending open delivery end, as shown in detail in Fig. 8. The cartridge 26 is detachably mounted on the head 28 by suitable means, which will be described in detail subsequently, below the delivery end of the duct 90. The charge 92 of beverage-producing ingredient, such as ground coffee, is placed in the cartridge 26 where it is tightly packed and held in place by a filter 94 which closes the mouth of the cartridge. A connector 96 attached to the open end of the pipe 90 by a coupling member 98 bears against the filter 94 and directs the stream of heated water from the pipe 90 into the charge 92.

The cartridge 26, in accordance with the principles of the invention, has an open mouth at one end, that is, the upper end thereof, and is closed at its other or lower end 100. The wall 102 of the cartridge 26 preferably is formed as a surface of revolution that converges from the mouth of the cartridge to the closed end 100. When the brewer is in operation, hot water from the duct 90 enters the cartridge through the center of the filter 94 and penetrates the charge 92 downwardly over a relatively small cross-sectional area for a substantial depth, thence gradually spreading out and working its way upwardly through the charge 92. The reversal in flow of the water and the upward spreading action thereof are guided by a protuberance 104 projecting upwardly from the bottom 100 and by the upwardly divergent configuration of the wall 102. The ground coffee or other ingredient is forced up against the filter 94 by the pressure of the water. The rate at which the water permeates the charge 92 is determined by the setting of the needle valve 80, Fig. 4. An opening 106 is provided in the side panel 108 of the chassis 20 for enabling a screwdriver or other adjusting instrument to be inserted for adjusting the needle valve 80 to regulate the flow of water. The completed infusion emerges from the charge 92, Fig. 8, over a relatively large area and drains through a spout or lip 110, Fig. 2, formed in the upper end of the cartridge 26, from whence it is delivered to the decanter 30. After passage of the water through the charge 92, the charge is found to have a substantially pear-shaped cavity therein, as indicated at 112 in Fig. 8.

The foregoing describes in a general way the course of the water through the apparatus and the production of the beverage at the point of delivery thereof remote from the source of heated water. The various portions of the apparatus now will be described with particular reference to the details illustrated in the drawings.

Figures 2, 3:
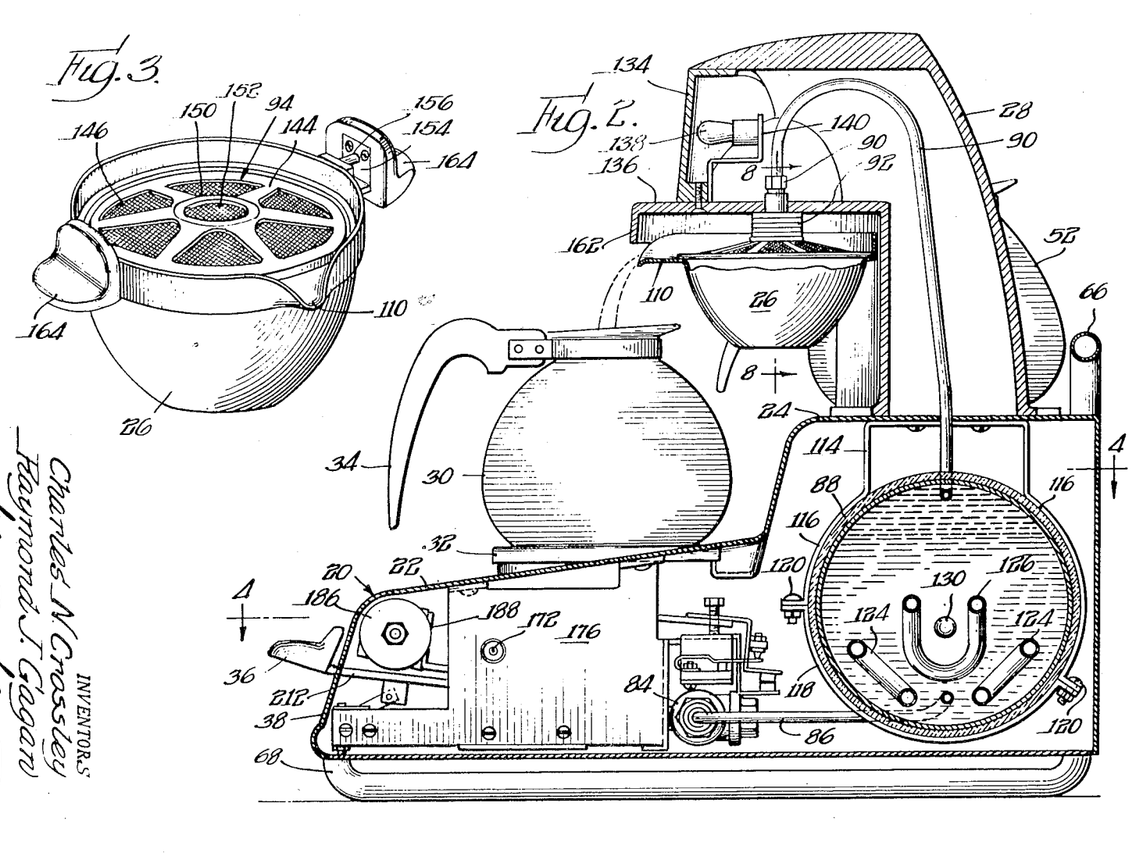
Fig. 2 is a vertical sectional view taken substantially on the line 2—2 in Fig. 1.
Fig. 3 is a perspective view of a cartridge employed in the beverage brewer.
Figure 4:
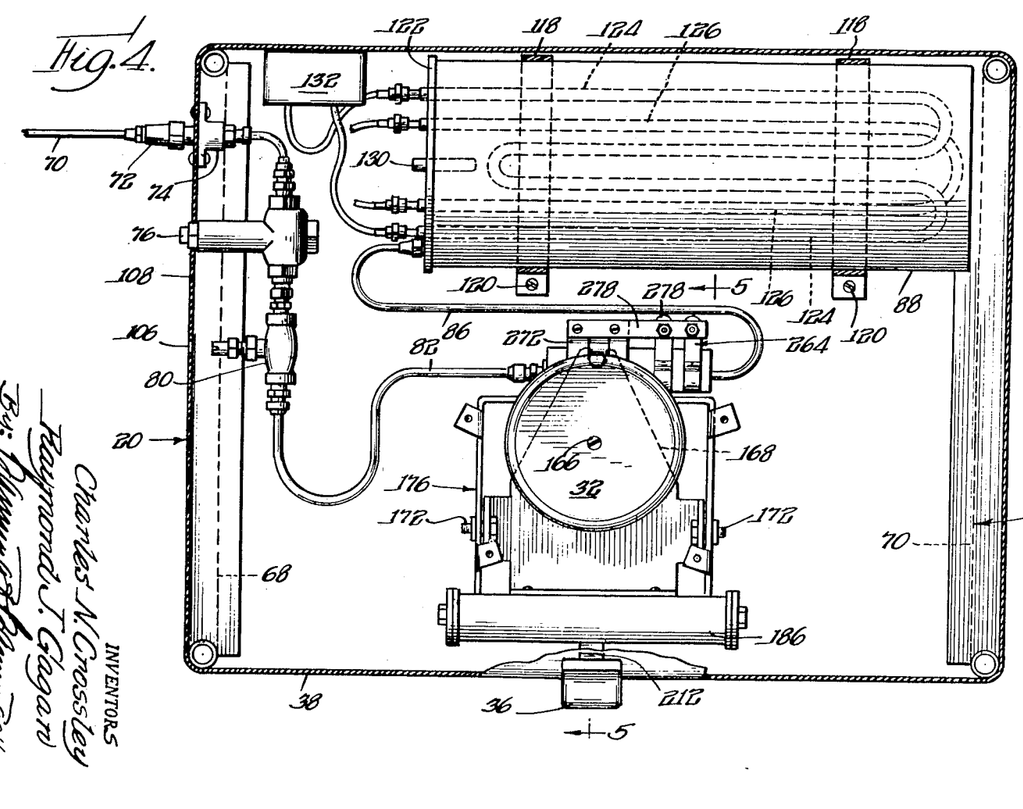
Fig. 4 is a plan sectional view taken substantially on the line 4—4 in Fig. 2.

The water tank 88 is of cylindrical form and is suspended from the upper section 24 of the chassis by brackets such as 114, Fig. 2, which are secured in any desired manner to the under side of the upper section 24. The legs of the brackets 114 are extended as arcuate bands 116 which partially encircle the tank 88. Other arcuate bands 118 are connected to the ends of the bands 116 by bolts 120 to clamp the tank 88 firmly in position. A cover 122, Fig. 4, is mounted on one end of the tank 88. Suitable openings are provided in this cover for extending electrical connections to the water heating elements and thermostat which are immersed in the water contained by the tank 88. A high heat element 124 is provided for bringing the incoming water rapidly up to the desired temperature. An auxiliary or standby heater 126 supplies sufficient heat to the water to compensate for heat lost through the wall of the water tank, thereby maintaining the water at the desired high temperature. The tank 88 may be covered with heat-insulating material such as asbestos to minimize heat losses. The heating element 124 is controlled by a thermostat 130 through the medium of a relay 132.

The head 28 is secured to the chassis 20 and has a shape approximately like an inverted L. The head is hollow and encloses the outlet pipe 90 from the water tank 88. The projecting front portion of the head is cut away to receive a translucent plastic front piece or window 134, Figs. 1 and 2, which rests upon and is secured to a horizontal shelf 136 that is an integral part of the head 28. An electric lamp 138, Fig. 2, is positioned on a bracket 140 behind the window 134, this lamp being lighted when the brewer is in operation. The head 28 and window 134 are designed to present an attractive appearance, not necessarily being limited to the configuration as shown.

Figures 8, 9, 10, 11:
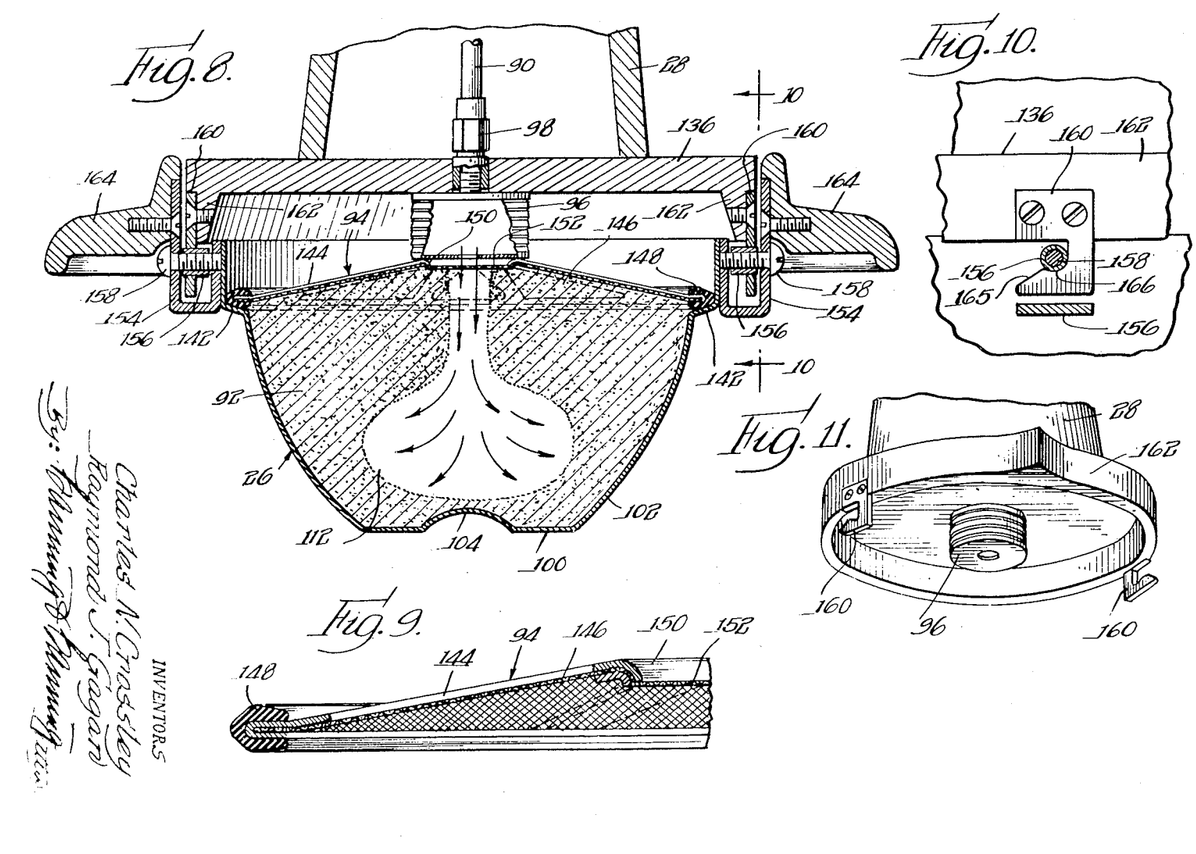
Fig. 8 is a detail sectional view of the cartridge and associated parts taken on the line 8—8 in Fig. 2.
Fig. 9 is a fragmentary sectional view of the filter employed in conjunction with the cartridge illustrated in Fig. 8.
Fig. 10 is a sectional view taken on the line 10—10 in Fig. 8.
Fig. 11 is a perspective view, looking from below, of a portion of the structure associated with the cartridge.

The cartridge 26, Figs. 3 and 8, as previously described, is open at its upper end and closed at its lower end. This cartridge is made of any suitable material such as stainless steel. The upper part of the cartridge 26 is outwardly offset to afford an annular ledge 142 on which the filter 94 is adapted to seat. The filter 94 is of reinforced construction so as to be relatively rigid. As illustrated, the filter 94 comprises a truss or spider 144 of frusto-conical shape, the apex thereof being adapted to be positioned adjacent the connecter 96 which is attached to the delivery end of the hot water pipe 90. The spider 144 supports a screen or strainer 146 of stainless steel wire gauze or the like, as shown in Fig. 9. The outer periphery of the spider 144 is fitted into a gasket 148 that is adapted to seat on the ledge 142, Fig. 8. A circular screen 152 is carried by a ring 150 that is formed centrally of the spider 144 to provide a seat for the lower end of the connecter 96. The spreading out of the hot water at the bottom of the charge and the reversal of the flow of the water from a downward direction to an upward direction produces a leaching of the coffee and the liberation of carbon dioxide gas ($CO_2$) and the formation of bubbles which rise and carry with them fine particles of the ground coffee. The bubbles and fine particles collecting at the lower face of the screen 146 form a filter bed through which the liquid is filtered, whereby finer particles are prevented from passing through the screen and a clear, uniform liquid results.

The cartridge 26 preferably is mounted on trunnions supported by the head 28. Thus, as shown in Fig. 8, two U-shaped brackets 154 are secured at diametrically opposite points to the outer circular face of the cartridge 26 at the upper end thereof. As shown in Fig. 3, the spout 110 of the cartridge is positioned midway between the brackets 154. Rollers 156, Figs. 8 and 10, are rotatably mounted on screws 158 which extend through the legs of the brackets 154. Trunnion plates 160, notched as shown in Figs. 10 and 11, are screwed to the sides of the flange 162 depending from the shelf 136 to receive the rollers 156 when the cartridge 26 is assembled on the head 28. Grips 164, Figs. 3 and 8, are attached to the brackets 154 outwardly thereof whereby the cartridge 26 may be grasped by both hands and manipulated into operative position, thereby causing the rollers 156 to ride up on cam faces 165 and seat in locking recesses 166, Fig. 10, in the notched plates 160.

When the cartridge 26 is inserted in its position of use as just described, the connecter 96 is subjected to vertical endwise pressure by the filter 94 so as to be in water-tight sealing engagement therewith. We prefer to employ a resilient metallic connecter 96 of hollow, bellows-like construction, as illustrated in Figs. 2, 8 and 11, comprising a series of dished, elastic, metal sections and having a sealing face which abuts the ring 150 of the filter 94. This bellows connecter is effective to prevent escape of the water laterally therefrom except when the water pressure exceeds a predetermined safe limit. The reaction of the bellows against the filter 94 maintains the rollers 156 of the cartridge 26 firmly seated in their locking recesses 166, and further serves to maintain the cartridge level by exerting equal pressure at all points on the ring 150 of the filter.

Figure 5:
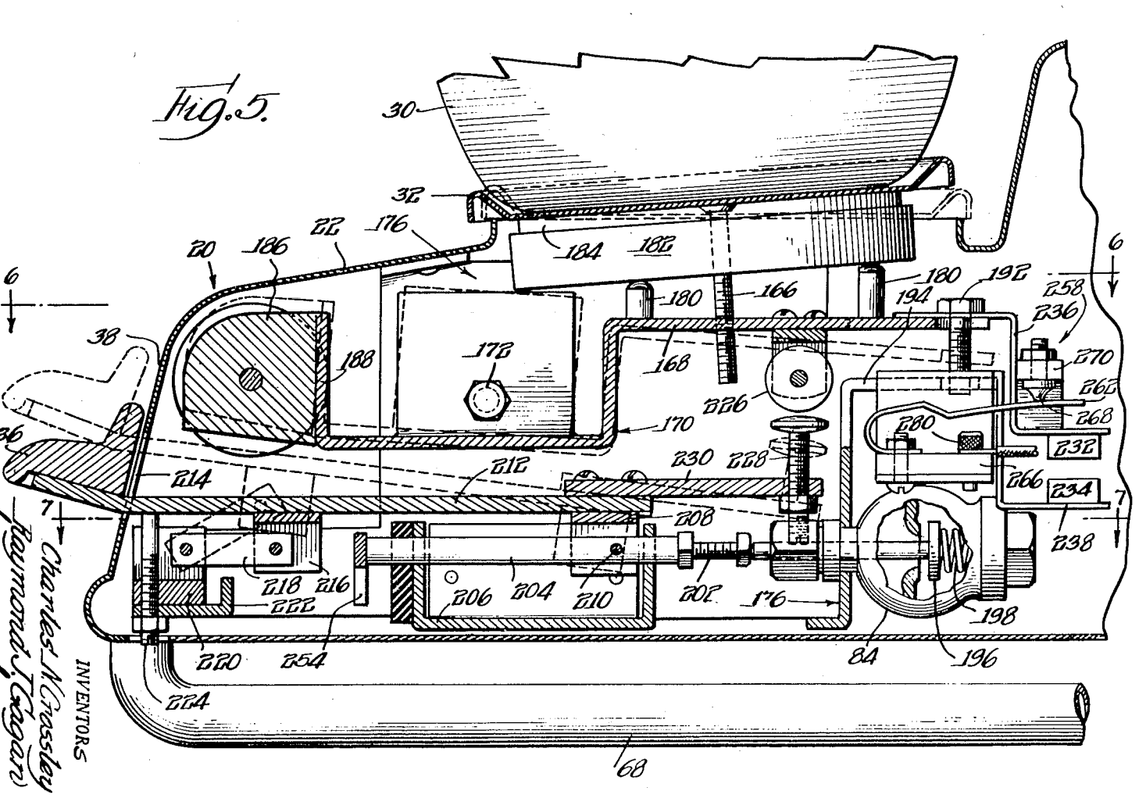
Fig. 5 is a sectional view of the beverage weighing mechanism, taken on the line 5—5 in Fig. 4.
Figure 6:
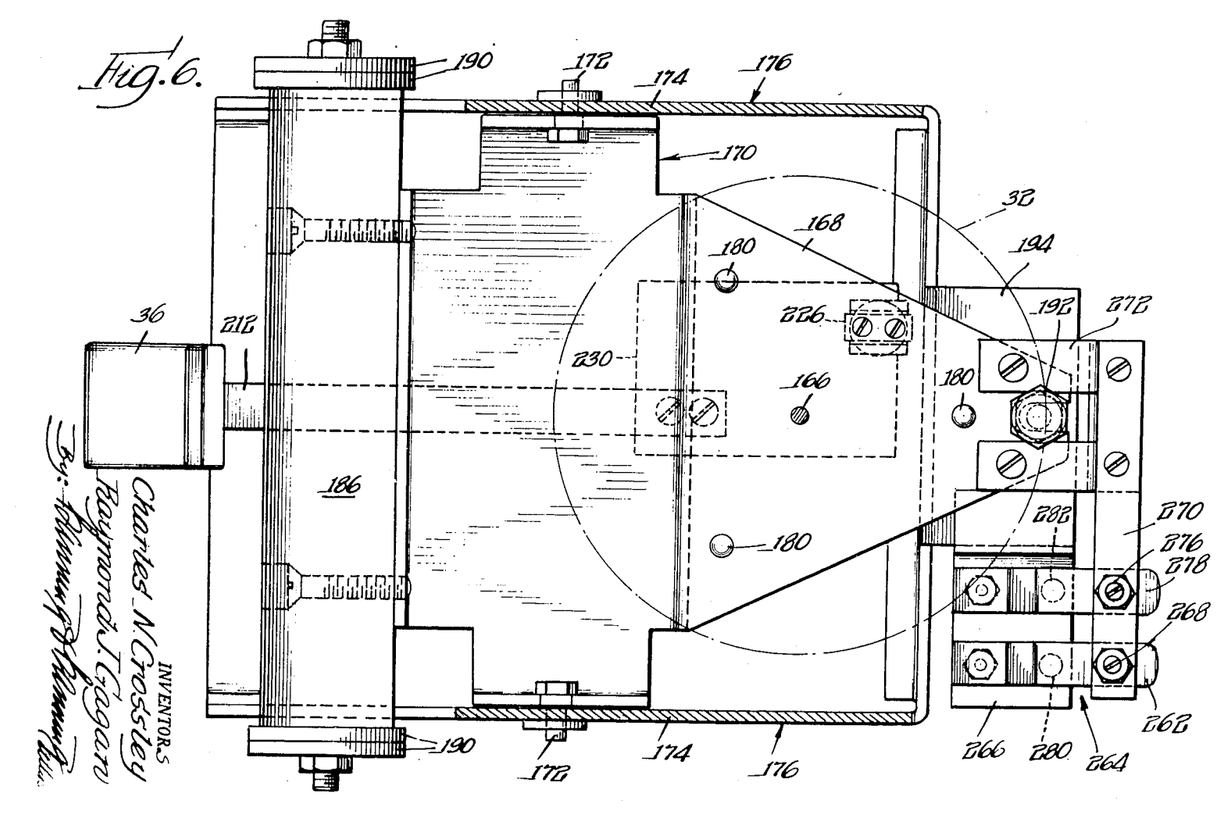
Figs. 6 and 7 are sectional views taken on the lines 6—6 and 7—7, respectively, in Fig. 5.

The platform 32, Figs. 2, 4 and 5, upon which the decanter 30 is supported to receive the freshly prepared beverage from the cartridge 26, is connected by a countersunk screw 166 to a triangular plate 168, Fig. 6, which forms one arm of a lever 170 that is carried by pivots 172 mounted in the sidewalls 174 of a frame 176. The frame 176 is suspended from the under side of the lower section 22 of the chassis 20. Studs 180 affixed to the upper side of the plate 168 support a disc-shaped metal shell 182, Fig. 5, that houses a heating element for keeping the beverage in the decanter 30 warm while it is on the platform 32. The heating element has a ceramic body 184 on which the platform 32 rests. Tightening the screw 166 therefore secures the platform 32 to the plate 168. The plate 168 extends rearwardly of the pivots 172, and a weight 186, Figs. 4, 5 and 6, is screwed to a flange 188 on the front end of the lever 170. Supplemental weights 190 may be attached to the weight 186 if desired. A stop screw or stud 192, Figs. 5 and 6, is threaded into a tapped opening in a horizontally extending lug 194 of the frame 176 and is received in a bifurcation at the rear edge of the triangular plate 168. The weight 186 on the lever 170 tends to urge the front end of the lever downwardly and the rear end of the lever 170 upwardly until the plate 168 is arrested by the head of the screw 192.

Figure 7:
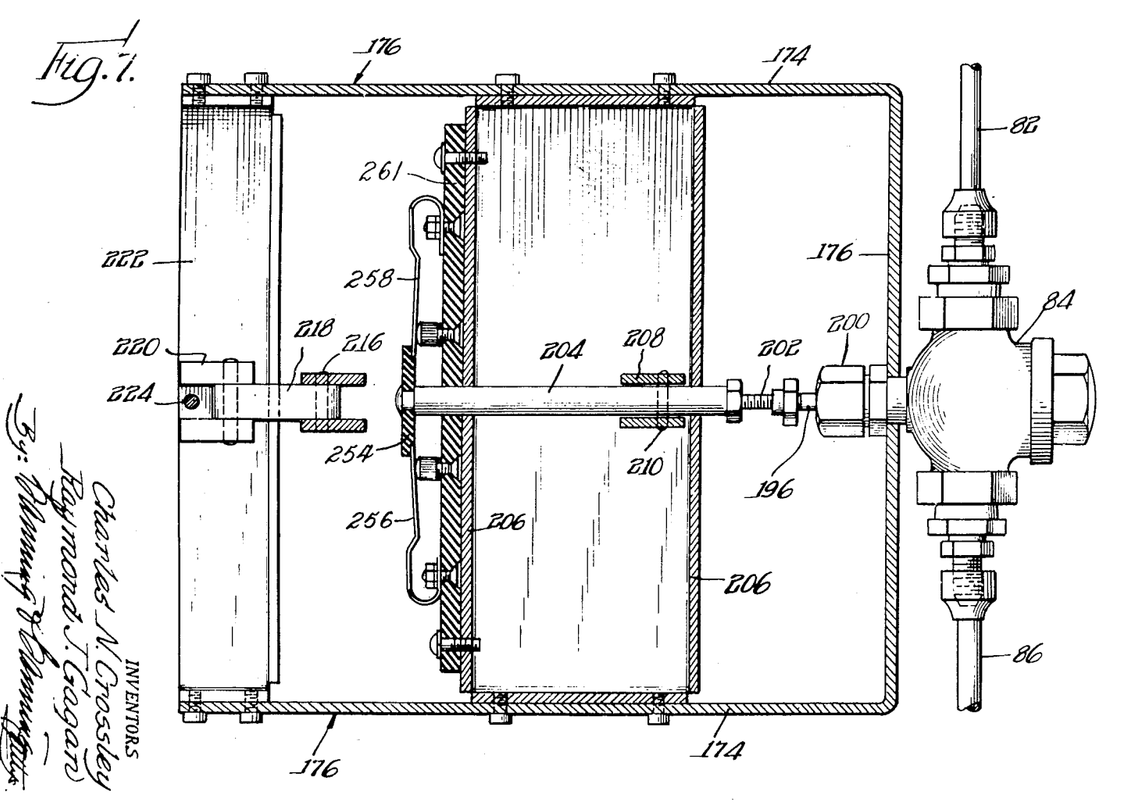

The valve 84, Figs. 5 and 7, which controls the flow of unheated water into the water heating tank 88 has a plunger 196 which normally is urged by a spring 198 into its closed position. The valve 84 is mounted on the frame 176, and the stem of the plunger 196 extends through a fitting 200. The plunger stem is in axial alignment with an adjusting screw 202 which is threaded into the end of an axially shiftable rod 204 that extends through the upstanding legs of a U-shaped bracket 206 carried by the frame 176. A yoke 208 is pivotally connected by a pin 210 to the rod 204 and carries a bar 212 that extends forwardly through a vertically extending slot 214 in the front panel 38 of the chassis 20. The control handle 36, mentioned hereinabove in connection with Fig. 1, is attached to the exposed end of the bar 212 as shown in Figs. 2, 5 and 6. Another yoke 216, Figs. 5 and 7, carried by the bar 212 is connected by a toggle link 218 to a stationary block 220 mounted on a bracket 222 secured to the frame 176. When the control handle 36 is depressed from the position in which it is shown in dotted outline (Fig. 5) to that in which it is shown in full lines, the bar 212 is moved rearwardly through concurrent rotation of the toggle link 218 from the dotted outline position thereof to the over-center full-line position shown in the same figure. This produces a corresponding rearward shift of the rod 204, thereby opening the valve 84 and compressing the valve spring 198. An adjustable stop screw 224 on the bracket 222 limits the downward movement of the bar 212 and handle 36. The reaction of the spring 198 on the rod 204 keeps the toggle 218 and bar 212 yieldably retained in their lower or full-line positions, as shown in Fig. 5.

The balance mechanism, of which the platform 32 is a part, functions to release the bar 212 and restore it to its upper or dotted-line position, Fig. 5, when a predetermined quantity of beverage has been delivered to the decanter 30. To this end, the plate 168 of the lever 170 carries on its under side a roller 226 which is vertically aligned with an adjustable abutment afforded by a screw 228 which is threaded into a rearward extension 230 of the bar 212. When a predetermined weight of beverage has been delivered to the decanter 30, the platform 32 commences to tilt downwardly. There is a small clearance between the roller 226 and the head of screw 228 when the platform 32 is in its upper or full-line position. As the platform 32 descends, the moment-arm of the effective downward force acting upon the rear arm 168 of lever 170 lengthens, while the moment-arm of the weight acting upon the front arm of this lever is shortened. To augment the force of gravity acting upon the lever arm 168, we provide a pair of permanent magnets 232 and 234 respectively mounted on a bracket 236, carried by the arm 168, and on a lug 238 of the frame 176. The force of attraction between the magnets increases as the distance separating them decreases. The combined effect of the foregoing is to build up a relatively large momentum for a small displacement of the lever 170, so that the roller 226 strikes the screw 228 with considerable impact, thereby overcoming the resistance of the toggle 218 practically instantaneously, whereupon the toggle moves into its broken-line position, Fig. 5, and the bar 212 and handle 36 are restored into their upper positions. Such restoration of the bar 212 relieves the thrust on the plunger 196 of the valve 84, enabling the valve spring 198 to close the valve 84 and shut off the supply of water to the tank 88. It will be understood that the unheated water which is admitted to the tank 88 under pressure, while the valve 84 is open, forces the heated water from the top of this tank through the outlet duct 90, and that when the flow of unheated water is interrupted, the flow of heated water likewise ceases.

Electrical connections of the beverage brewer are illustrated in the wiring diagram, Fig. 12. The apparatus is adapted to operate from a voltage source which provides both high voltage, such as 230 volts, and voltage of ordinary magnitude such as 115 volts. The electrical outlet box 240 has a terminal 242 connected with the neutral or ground terminal of the voltage source, and terminals 244 and 246 which are separated electrically from each other by the high voltage, say 230 volts, and from the center terminal 242 by the normal voltage, say 115 volts. The high heat element 124 in the water tank 88 is connected in series with the normally open contact 248 of the relay 132 across the high voltage terminals 244 and 246. The standby element 126 is connected at one end thereof to the terminal 246, the other end of the element 126 being connected through a wire 252 to the ground terminal 242. Thus the high heat element 124 normally is in a deenergized condition while the standby element 126 is continually energized by the voltage source. The element 126 maintains the water slightly warm so that it may readily be heated to brewing temperature by the element 124 when the brewer is in operation.

The reciprocatory rod 204, Fig. 5, which is actuated by the bar 212 carries a switch-operating member 254 of plastic or other suitable insulating material. When the control handle 36 is depressed to initiate a brewing operation, the member 254 simultaneously closes the switches 256, 258 and 260 that are mounted on an insulating plate 261 (Fig. 7) secured to the front wall of the bracket 206. Closure of switch 256 connects one end of the coil of relay 132 to the terminal 246 of the outlet box 240. The other end of the relay coil is connected through the thermostat 130 to the terminal 242.

At the start of the brewing operation the contacts of thermostat 130 are closed so that closure of the switch 256 causes the relay contact 248 to close circuit through the high heat element 124. The element 24 functions to bring the water rapidly to brewing temperature or slightly above this temperature. When this condition is reached, the thermostat 130 opens its contacts until such time as the temperature of the water in the vicinity of the thermostat drops below a predetermined temperature. This affords a close control over the temperature of the heated water supplied through the outlet duct 90 of the tank 88. A condenser 257 is shunted across the contacts of the thermostat 130 to reduce arcing. Chattering of the thermostat contacts also is prevented by this means.

Closure of switch 258 when the control handle 36 is depressed extends circuit from the terminal 246 to the spring blade 262 of a switch 264, Figs. 4, 5, 6 and 12, that is anchored at one end on an insulating plate 266 attached to the lug 194 on the frame 176. The contact strip 262 bears against a contact screw 268 on a member 270 of plastic or other insulating material that is carried by the bracket 236 on the lever arm 168. The contact screw 268, as shown in Fig. 12, is electrically connected to one end of the heating element 274 beneath the weighing platform 32. The other end of the element 274 is electrically connected to a contact screw 276, Figs. 6 and 12, on the member 270. The contact screws 276 and 268 are continually engaged with the spring contact strips 278 and 262 respectively, the strip 278 being anchored at one of its ends to the stationary insulating plate 266. The strip 278 is electrically connected to the terminal 242 of the outlet box 240. Hence depression of the control handle 36 and consequent closure of switch 258 promptly closes the circuit through the warming element 274 on the platform 32 for maintaining the beverage in the decanter 30 at drinking temperature.

Actuation of the handle 36 likewise closes the switch 260 to extend the circuit from terminal 246 through the pilot light 138, Figs. 2 and 12, and back to the terminal 242. The translucent window 134 thereupon is illuminated to indicate that the brewing operation is in process.

When the predetermined quantity of beverage has been delivered to the decanter 30 on the weighing platform 32, the lever arm 168 descends whereupon the contact strips 262 and 278 are brought into engagement with stationary contacts 280 and 282, Figs. 5 and 6, on the insulating plate 266. The contact screws 268 and 276 ride on the strips 262 and 278 to maintain electrical connection therewith. The contact 282 has no electrical connection to the circuit, but contact 280 is in permanent electrical connection with the terminal 246. Therefore, opening of the switch 258 when the control handle 36 is released and restored to its upper position does not disconnect the warming element 274, which remains energized through the contacts 280, 262 and 268 until the decanter is removed from the platform. Restoration of the weighing platform to its normal upper position breaks the circuit to the element 274 until such time as the control handle 36 again is depressed.

The warming elements 284, 286 and 288, Fig. 12, respectively disposed beneath the warming plates 40, 42 and 44, Fig. 1, are controlled respectively by the on-off switches 46, 48 and 50. The high-low switch 60 for the heating element 56 has two spaced stationary contacts 290 and 292. When the movable switch member is engaged with the contact 292 the low heat resistor 294 of the heating element 56 is energized through a resistor 296, the circuit being completed through the high heat resistor 298 of element 56 and the on-off switch 58, assuming that this switch is closed. The current which flows through the winding 298 under these circumstances is not sufficient to produce high heat. For high heat operation of the element 56, the movable member of a switch 60 is engaged with the contact 290 to extend circuit directly through the resistor 298 and switch 58.

The novel beverage brewer disclosed herein affords numerous advantageous features as will be apparent to those skilled in the art. A perfect brew is assured because of the automatic control over temperature and amount of water used and the brewing time of the beverage. A large quantity of beverage can be prepared in a relatively short time by the brewer. To expedite the brewing operation a number of cartridges, as 26, may be held ready for use on a suitable cartridge rack (not shown) so that no time will be lost in recharging a cartridge between batches. The brewer is efficient in its operation and presents a pleasing appearance. The operator is not exposed to the hazard of scalding which is a detriment in the case of many commercial brewers. Moreover, the operator need not be skilled in the preparation of coffee inasmuch as the brewer automatically controls the operation of preparing the beverage throughout. The combination of the balance and toggle mechanism for weighing the coffee and controlling the flow of water provides a positively acting control.

Particular attention is directed to the special design of the cartridge 26 which, in conjunction with the other features of the invention, insures that the coffee infusion or other beverage prepared therein will be of the best quality obtainable from the beverage-producing ingredient utilized and of uniform strength. The bellows type of connecter 96 materially expedites the insertion and removal of the cartridge. The expansive action of the bellows 96 stabilizes the cartridge as it is suspended from its trunnions. At the same time a certain amount of flexing movement of the connecter is permitted whereby for example, accidental joggling of the cartridge while the brewing operation is in process does not destroy the water-tight seal between the connecter and the filter member 94. At the conclusion of the brewing operation the operator may tip the cartridge slightly forward to drain off any excess hot liquid before removing the cartridge, thus further reducing any danger of scalding. All parts which contact the beverage are readily removable for cleaning. The shape of the cartridge renders it particularly convenient to keep clean. The connecter 96 can be removed by unscrewing for such occasional cleaning of this part as may be required.

It should be understood that a multiple brewer having several hot water ducts and associated cartridges for simultaneously preparing a plurality of batches of beverage is contemplated herein. Furthermore, the invention is not limited to a portable cartridge, but may be adapted to utilize a cartridge which is not removable from the brewer.

While the brewer herein disclosed utilizes an electric water heater, any other suitable water heating and temperature controlling means may be employed. Specifically, we contemplate adapting the brewer for use with a thermostatically controlled gas water heater in certain types of installations.

It is obvious that various changes may be made in the specific embodiment set forth for purposes of illustration without departing from the spirit of the invention. The invention is accordingly not to be limited to the specific embodiment shown and described, but only as indicated in the following claims.

We claim:

1. A method of preparing coffee beverage which comprises enclosing a predetermined quantity of ground coffee within a space of fixed dimensions, forcing a stream of heated water of relatively small cross-sectional area downwardly to penetrate the mass of coffee from the top thereof for a substantial distance therein, reversing the flow of water from said stream from a downward direction to an upward direction after such penetration of the coffee, spreading the reverse flow of water throughout the coffee, leaching the ground coffee and liberating carbon dioxide gas to form bubbles which rise and carry with them fine particles of coffee, whereby a filter bed is formed at the top of the mass, and filtering the completed beverage from the coffee over a relatively large area and through said filter bed.

2. A method of preparing coffee beverage which comprises filling a space of predetermined dimensions with ground coffee, said space being of substantially larger cross-sectional area at its upper end than at its lower end, forcing a stream of heated water of relatively small cross-sectional area downwardly into the mass of coffee for a substantial depth therein, spreading the flow of water from said stream outwardly throughout the mass of coffee, and reversing the flow of water from a downward direction to an upward direction, leaching the coffee and liberating carbon dioxide gas and producing bubbles which rise and carry with them fine coffee particles to form a filter bed at the top of the mass, and filtering the completed beverage from the coffee at the upper end of said space through said filter bed.

CHARLES N. CROSSLEY.
RAYMOND J. GAGAN.

REFERENCES CITED

The following references are of record in the file of this patent:

UNITED STATES PATENTS

| Number | Name | Date |
|---|---|---|
| 411,656 | Green | Sept. 24, 1889 |
| 1,762,209 | Aborn | June 10, 1930 |
| 2,088,966 | Lyons | Aug. 3, 1937 |
| 2,282,138 | Kellogg | May 5, 1942 |